United States Patent
Tione et al.

(10) Patent No.: US 11,654,876 B2
(45) Date of Patent: May 23, 2023

(54) BRAKING CONTROL SYSTEM

(71) Applicant: FAIVELEY TRANSPORT ITALIA S.p.A., Piossasco (IT)

(72) Inventors: Roberto Tione, Lauriano (IT); Matteo Frea, Turin (IT); Luc Imbert, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 535 days.

(21) Appl. No.: 16/646,413

(22) PCT Filed: Sep. 12, 2018

(86) PCT No.: PCT/IB2018/056951
§ 371 (c)(1),
(2) Date: Mar. 11, 2020

(87) PCT Pub. No.: WO2019/053599
PCT Pub. Date: Mar. 21, 2019

(65) Prior Publication Data
US 2020/0269823 A1 Aug. 27, 2020

(30) Foreign Application Priority Data
Sep. 13, 2017 (IT) .......................... 102017000102369

(51) Int. Cl.
*B60T 8/00* (2006.01)
*B60T 8/32* (2006.01)
(Continued)

(52) U.S. Cl.
CPC ............ *B60T 8/3245* (2013.01); *B60T 8/171* (2013.01); *B60T 8/172* (2013.01); *B60T 8/1705* (2013.01);
(Continued)

(58) Field of Classification Search
CPC ...... B60T 8/3245; B60T 8/1705; B60T 8/171; B60T 8/172; B60T 8/17636;
(Continued)

(56) References Cited

U.S. PATENT DOCUMENTS

| 4,936,610 A | 6/1990 | Kumar et al. |
| 5,775,228 A | 7/1998 | Lamba et al. |

(Continued)

FOREIGN PATENT DOCUMENTS

| EP | 1473485 A2 | 11/2004 |
| EP | 2648949 A1 | 10/2013 |

(Continued)

OTHER PUBLICATIONS

International Search Report, issued in PCT/IB2018/056951, dated Feb. 1, 2019, Rijswijk, Netherlands.
Notice of Reasons for Refusal for Japanese Patent Application No. 2020-514272 dated Sep. 6, 2022 (7 pages).

*Primary Examiner* — Truc M Do
(74) *Attorney, Agent, or Firm* — The Small Patent Law Group LLC; Christopher R. Carroll

(57) ABSTRACT

A service and emergency braking control system for at least one railway vehicle, including a plurality of braking control modules is provided. Each braking control module is equipped for: if, when achieving a determined braking torque value from an applied braking torque, an instantaneous deceleration value is lower than the target deceleration value, increasing the applied braking torque until the instantaneous deceleration value reaches the target deceleration value, or until the maximum available adhesion from an axle controlled by said braking control module is indicated.

20 Claims, 9 Drawing Sheets

(51) Int. Cl.
*B60T 8/17* (2006.01)
*B60T 8/171* (2006.01)
*B60T 8/172* (2006.01)
*B60T 8/1763* (2006.01)
*B60T 8/18* (2006.01)
*B60T 8/74* (2006.01)
*B60T 13/58* (2006.01)
*B60T 13/66* (2006.01)

(52) U.S. Cl.
CPC ........ *B60T 8/17636* (2013.01); *B60T 8/1893* (2013.01); *B60T 8/74* (2013.01); *B60T 13/586* (2013.01); *B60T 13/662* (2013.01); *B60T 13/667* (2013.01); *B60T 2250/00* (2013.01); *B60T 2250/02* (2013.01); *B60T 2270/10* (2013.01); *B60T 2270/604* (2013.01)

(58) Field of Classification Search
CPC ........ B60T 8/1893; B60T 8/74; B60T 13/586; B60T 13/662; B60T 13/667; B60T 2250/00; B60T 2250/02; B60T 2270/10; B60T 2270/604
See application file for complete search history.

(56) References Cited

U.S. PATENT DOCUMENTS

| | | | |
|---|---|---|---|
| 5,820,226 A | * | 10/1998 | Hart ...................... B60T 8/1893 |
| | | | 303/7 |
| 2004/0075280 A1 | | 4/2004 | Kumar et al. |
| 2007/0001629 A1 | | 1/2007 | McGarry et al. |
| 2007/0272116 A1 | * | 11/2007 | Bartley ..................... B61C 7/04 |
| | | | 903/903 |
| 2008/0228368 A1 | * | 9/2008 | Fuhrer ............ B60W 30/18127 |
| | | | 701/81 |

FOREIGN PATENT DOCUMENTS

| | | |
|---|---|---|
| IT | 102016000034535 | 4/2016 |
| JP | S506928 B1 | 3/1975 |
| JP | H0565065 A | 3/1993 |
| JP | H1044964 A | 2/1998 |
| JP | 2003160043 A | 6/2003 |
| JP | 2012010505 A | 1/2012 |
| WO | 2017109690 A1 | 6/2017 |

* cited by examiner

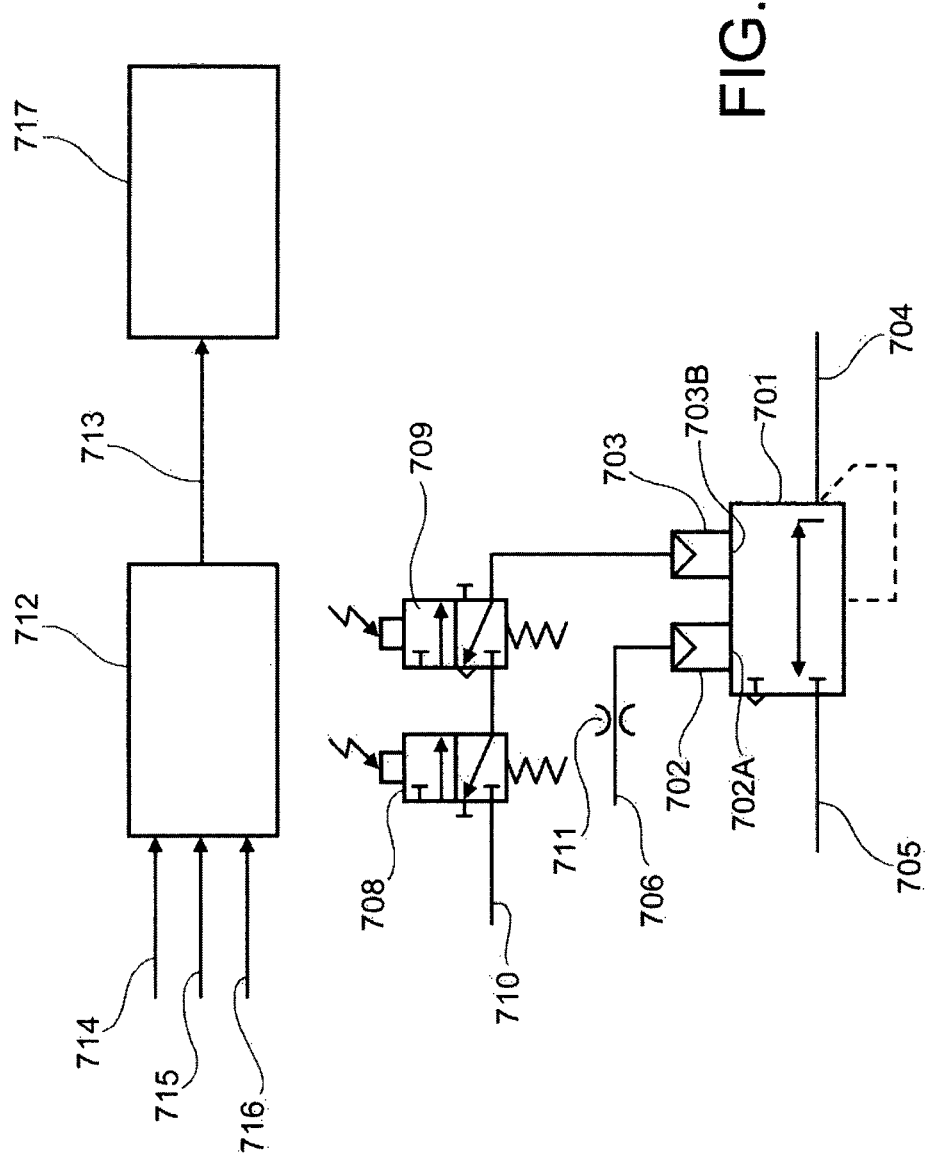

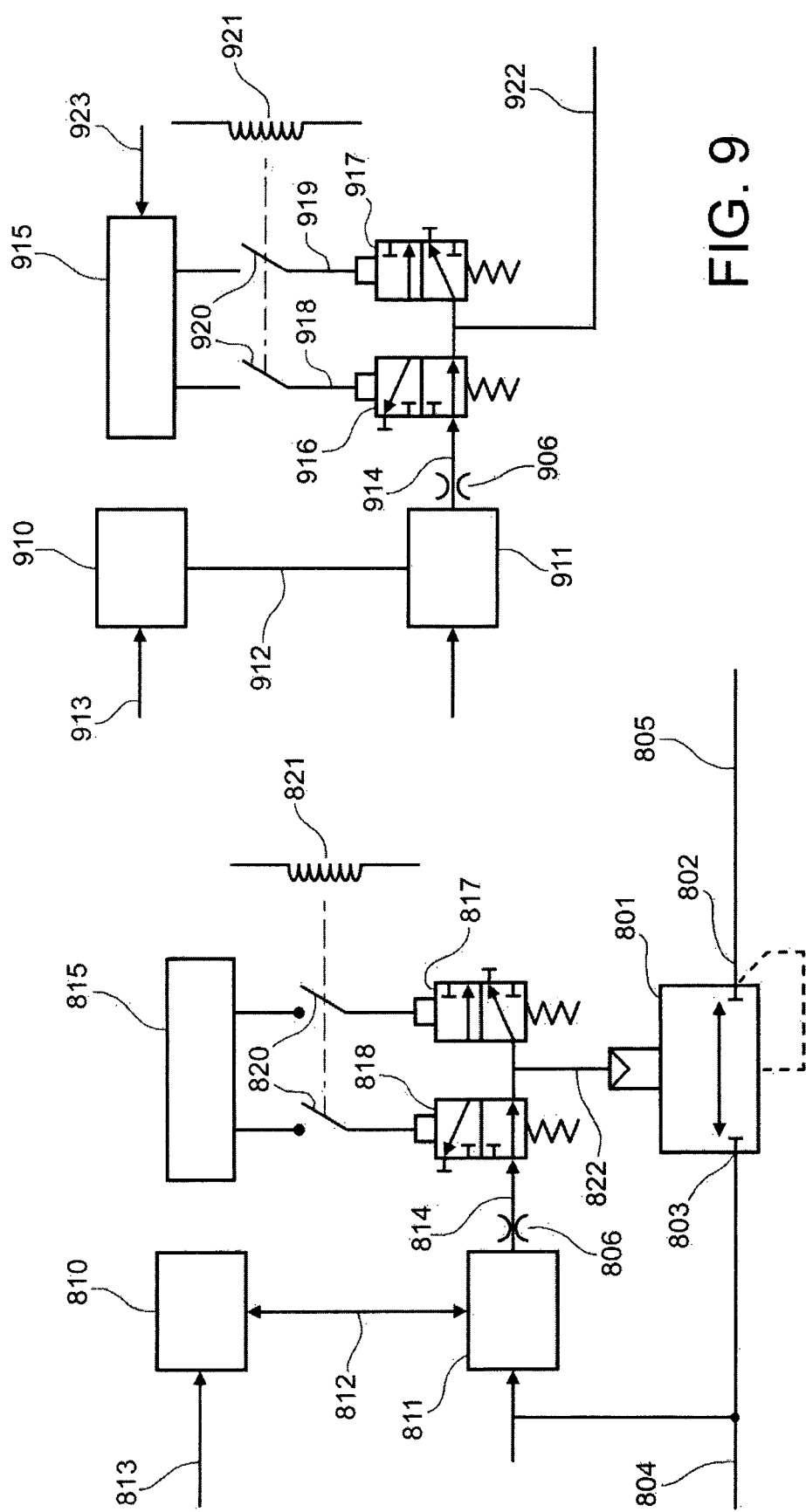

BRAKING CONTROL SYSTEM

CROSS-REFERENCE TO RELATED APPLICATIONS

This application is a National Phase filing of PCT International Application No. PCT/IB2018/056951, having an International Filing Date of Sep. 12, 2018, claiming priority to Italian Patent Application No. 102017000102369, having a filing date of Sep. 13, 2017 each of which is hereby incorporated by reference in its entirety.

FIELD OF THE INVENTION

The present invention concerns a system for optimizing the braking of a railway vehicle, in particular in the event of a degraded adhesion condition or in the event of degraded operation of the braking system.

BACKGROUND OF THE INVENTION

FIG. 1 illustrates a possible, but not exclusive, architecture of a state-of-the-art railway braking system. A rail braking system produces a braking torque CF 100 applied to an axle 101 which is bound to two wheels 102. The braking torque CF 100 is generated by a pneumatic pressure 105 applied to one or more braking cylinders 103 acting via friction means 133 directly on the wheels 102 or on one or more discs, not shown in the figures, mechanically connected to the axle 101.

Moreover, said braking torque CF 100 may be generated by a regenerative braking system, also known as an electrodynamic braking system, by using an electric motor 104 connected directly or through gear reduction systems to said axle 101. The braking pressure 105 is generated by an electropneumatic module EP-Module 106 controlled by an electronic unit BCU 107. Said electropneumatic module 106 consists of solenoid valves, pneumatic valves and pressure transducers according to electropneumatic diagrams that are part of the prior art known to persons skilled in the art.

Said electronic unit BCU 107 controls the electropneumatic module 106 to obtain a braking pressure corresponding to a force derived from the deceleration request 110 and from the weight value 111. The weight value corresponds to the weight on the bogie, in a control per bogie, or to the weight of the vehicle, in a control per vehicle. The motor 104 is controlled by a Traction Control 108 in such a way as to produce a braking torque derived from the deceleration request 110 and the weight value 111.

The friction and electrodynamic braking contributions may be applied according to a variable percentage composition of the two forces over time, according to a method known in the railway world as "blended" braking. The percentage proportions of "blending" may be mapped a priori in the memory of the electronic unit BCU 107 and of the Traction Control 108 as a function of external variables such as motor regenerative efficiency, vehicle speed, bogie weight or vehicle weight. Those skilled in the art are aware of the existence of other possible, non-exclusive "blended" architectures, such that the percentage proportions of the two friction and electrodynamic braking contributions are calculated in real time by the electronic unit BCU 107, which will directly request an electrodynamic braking torque value from the Traction Control module 108, using signals not shown in the figures.

If, during braking, the braking force relative to the braking torque CF exceeds the available adhesion force value, e.g. yield degraded by rain or leaves or rust on the rail, the wheels 102 will enter a skidding and potential locking condition. In this case, the WSP (Wheel Slide Protection) system 109 will intervene. Such WSP system 109 may detect any decrease in the speed of the wheels 102 with respect to the speed of the vehicle by means of speed sensors relating to each axle (not shown in the figures). In case of variations above a predetermined threshold, the WSP 109 may modulate the pressure 105 to the brake cylinders 103 by energizing/de-energizing the solenoid valves 113 according to control algorithms that are part of the prior art known to those skilled in the art, so as to avoid the locking of the wheels and to maintain them in a controlled sliding condition that minimizes the loss of grip.

Similarly, WSP software modules integrated into the Traction Control 108 provide for modulating the braking torque produced by the motor 104 to prevent wheel locking and to maintain the wheels in a controlled sliding condition that minimizes loss of adhesion. The slide control actions of the WSP 109 and the WSP software module integrated in the Traction Control module 108 are synchronized with each other according to strategies known to those skilled in the art, through an exchange of signals between the two WSPs, said signals not being illustrated in the figures.

It is a known physical fact that during sliding, the wheels 102 inject mechanical and thermal energy into the contact point 112, in a quantity directly, not linearly, linked to the amount of sliding. Such energy partially cleans the contact point 112, improving the adhesion value left to the subsequent wheels at the passage of the wheels 102.

FIG. 10 shows a railway train composed of a plurality of vehicles, braking in degraded adhesion conditions. The adhesion required to decelerate the train according to a given deceleration request is $\mu_n$. The initial degraded adhesion encountered by the vehicle is $\mu_i < \mu_n$. For the sake of simplicity, it is assumed that the weight on all the wheels is uniform, therefore all the wheels are subjected to the same braking torque, as a consequence of the common deceleration request.

The wheel 1 starts a sliding phase which is controlled by the WSP systems by locally reducing the braking torque. Said controlled sliding carries out a partial cleaning in order to increase the adhesion to the level $\mu_2$. The sliding phenomenon and resulting cleaning occurs in a similar way for all the subsequent wheels that encounter a value $\mu < \mu_n$, and thus for the wheels 2, . . . , 6 which will improve the adhesion "released" up to the final value $\mu_f > \mu_n$. At this point, the braking torque applied to the wheel 7 and to the subsequent wheels is not such as to initiate further sliding phenomena.

In the prior art, no further action is taken by the braking systems, other than that described, i.e., protecting the wheels by locally limiting the braking torques through the coordinated actions of the WSP sub-systems. It is evident that due to the local limitations of the braking torques implemented by the WSP sub-systems, the stopping distances increase as a function of the degradation of the initial adhesion $\mu_i$. As known to those skilled in the art, during braking, even in the case that sufficient adhesion is available to avoid sliding, a phenomenon of micro-sliding is always active on the point of contact between the wheel and the rail, which continues to improve the available adhesion value within certain limits, as illustrated purely by way of example in FIG. 10. Thus, by increasing the braking torque beyond the value initially calculated on the wheels at the end of the train, it is possible to partially or totally compensate for the loss of adhesion that has occurred on the front wheels, partially or totally recovering the deceleration initially requested, and thus the relative braking distance.

For example, EP2648949 claims an adhesion recovering method in the event of degraded adhesion and during emergency braking which raises the pressure at the rear of the vehicle above the requested value. Such method is implemented by a centralized system requiring a means of communication to coordinate the various brake modules along the vehicle train. The solution claimed in EP2648949, however, has the following disadvantages:

- it is necessary to have a communication system that transfers information between the modules, considerably complicating the architecture of the braking system and the software connected thereto;
- a master device that coordinates the operations of the various modules is necessary;
- such method is supported by an information exchange and/or a master device that establishes how and which modules to activate to recover deceleration; therefore, if a single fault affects the communication network, or the master device, it is possible to achieve a complete loss of the same system;
- since the software for this system has to be developed according to the standards EN50126/EN50128/EN50129 at SIL≥3 levels, the overall complexity and cost of the system and the communication network increases due to the implementation constraints imposed by said standards;
- since in many train architectures a global communication system for the brake system is not available at train level but only at the vehicle level, a system based on information exchange between modules may not be able to implement the method claimed at train level.

SUMMARY OF THE INVENTION

The object of the present invention is therefore to provide a service and emergency braking control system for at least one railway vehicle that allows the deceleration initially lost in case of a degraded adhesion condition to be recovered, and also in case of operation of the braking system in a degraded way due to possible malfunctions. The present invention claims the use of a plurality of functional modules for the control of the braking system completely independent of each other, each used for the control of an individual braking torque; the use of an algorithm that is based on system observations in order to operate correctly without the need to receive information from other modules belonging to the same system without the need for a centralized control.

The aforesaid and other objects and advantages are achieved, according to an aspect of the present invention, by a service and emergency braking control system for at least one railway vehicle having the features described below. Preferred embodiments of the invention are also described.

The functional and structural characteristics of some preferred embodiments of a service and emergency braking control system for at least one railway vehicle according to the present invention will now be described. Reference is made to the accompanying drawings.

BRIEF DESCRIPTION OF THE DRAWINGS

FIG. 7 illustrates a first embodiment of a service and emergency braking control system;

FIG. 8 illustrates a second embodiment of a service and emergency braking control system;

FIG. 9 illustrates a third embodiment of a service and emergency braking control system;

DETAILED DESCRIPTION

Figure 1:
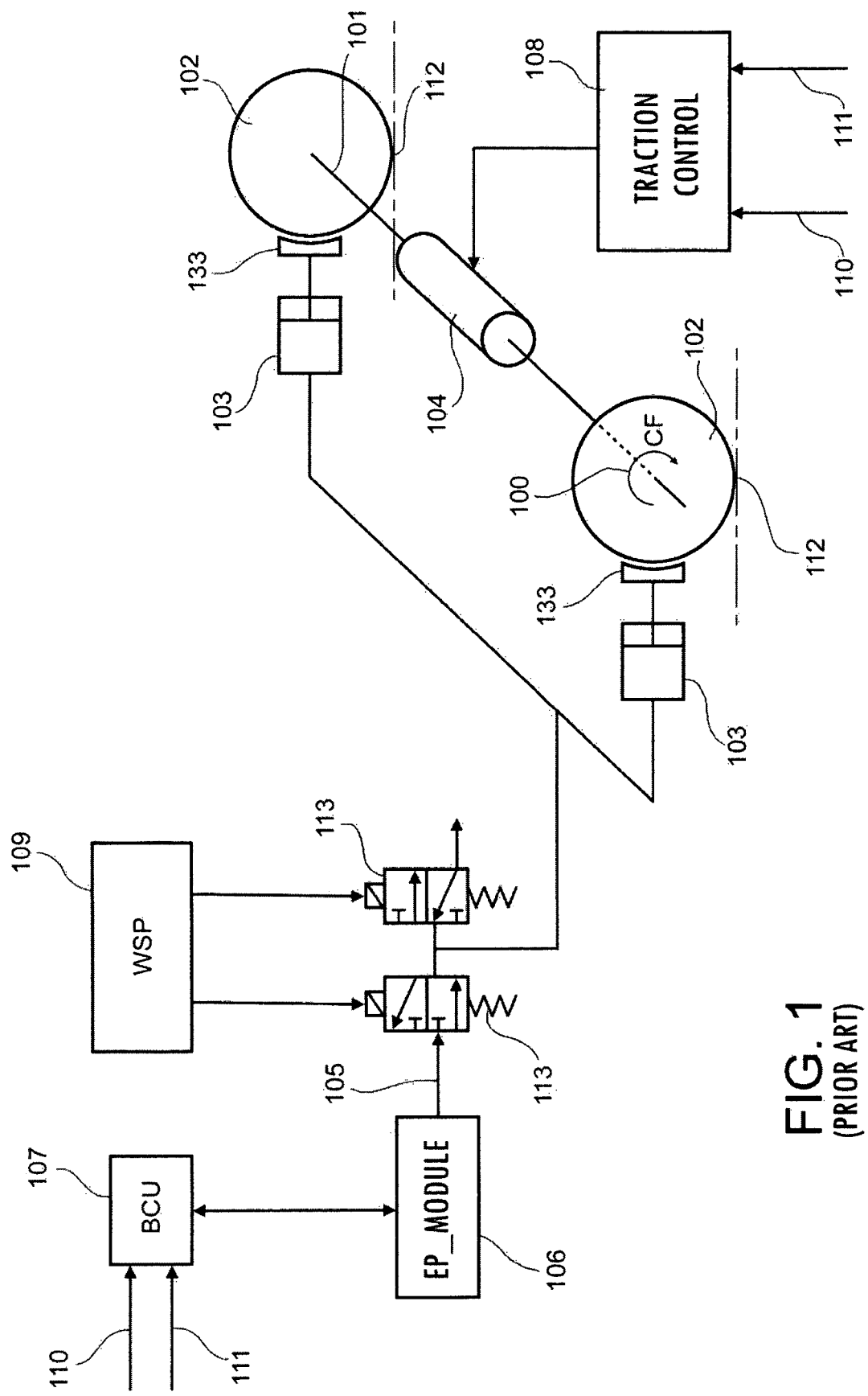
FIG. 1 shows a basic functional diagram of a possible state-of-the-art brake system.

Before explaining a plurality of embodiments of the invention in detail, it should be clarified that the invention is not limited in its application to the details of construction and to the configuration of the components presented in the following description or illustrated in the drawings. The invention may assume other embodiments and may be implemented or achieved in essentially different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

In addition, in the present description, it should be understood that a plurality of connected railway vehicles makes up a railway train.

Unless otherwise indicated, in the following, reference will be made to braking torque, indicating with this definition a torque produced solely by friction braking force alone, or solely by electrodynamic torque generated by traction motors, or by a composition in variable percentage over time of the two torques.

Figure 2:
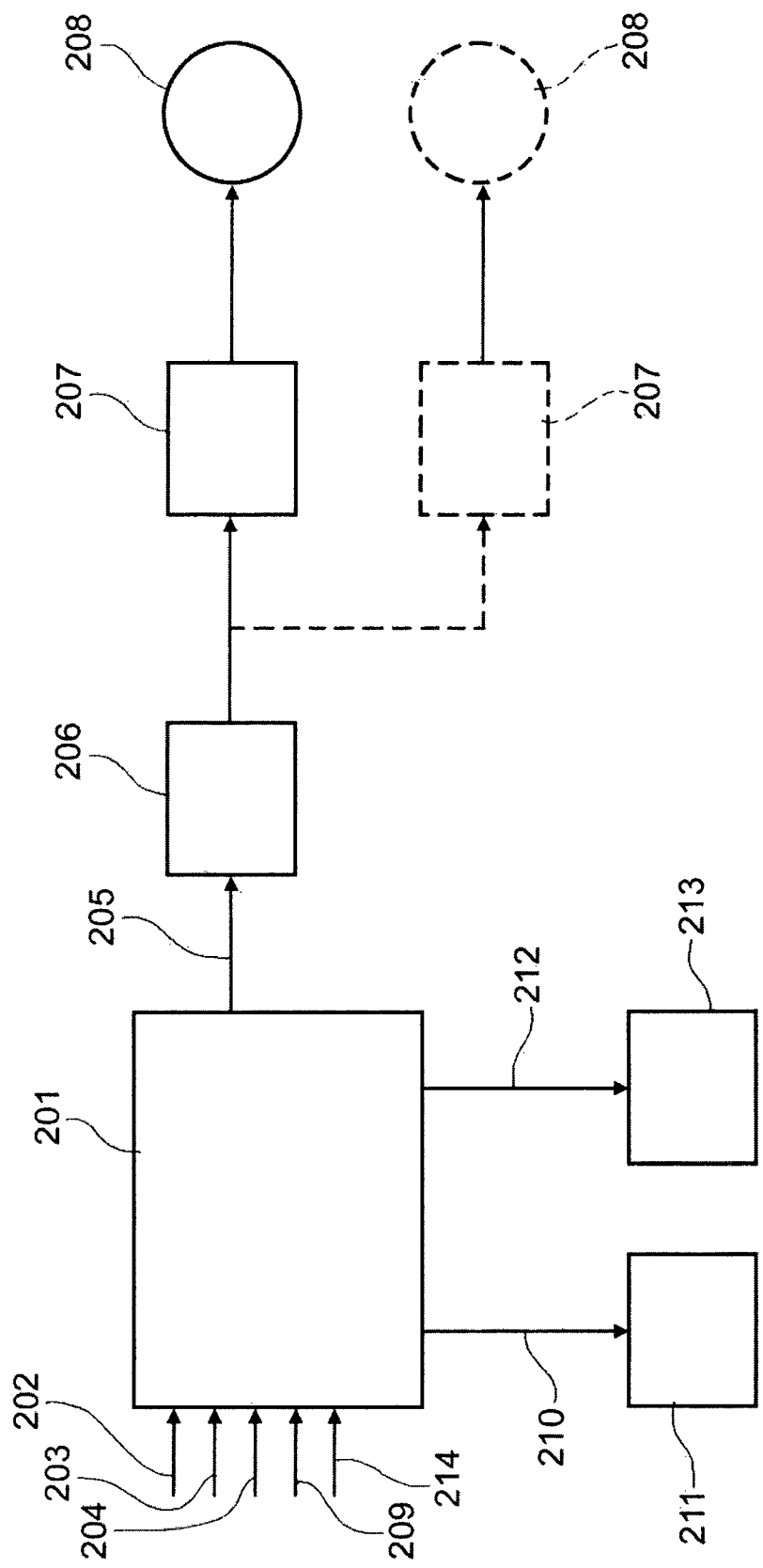
FIG. 2 shows the functional diagram of a system for controlling the braking of an axle according to the present invention.

Referring initially to FIG. 2, the functional diagram of a braking control module for an axle according to the present invention is illustrated.

The braking control system for at least one railway vehicle includes a plurality of braking control modules 201.

Each of the braking control modules 201 is arranged to control at least one respective axle of a railway vehicle and to receive a deceleration request signal 202.

Such deceleration request signal 202 is common to all braking control modules 201 and is arranged to indicate a deceleration target value of at least one railway vehicle to be achieved.

Each of the braking control modules 201 is moreover arranged to receive an instantaneous deceleration signal 209 to indicate an instantaneous deceleration value of at least one railway vehicle and a signal of achievement of maximum available adhesion 204, provided to indicate the achievement of the maximum available adhesion by an axle controlled by said braking control module 201.

For convenience, the definition of "maximum available adhesion achieved" will now be abbreviated to MAAA (Maximum Available Adhesion Achieved). In this embodiment, by way of example, MAAA=0 shall mean when the braking control module 201 is not fully using the adhesion available to the wheels of the axle thereby controlled, and MAAA=1 shall mean when the wheels of the axle controlled by the module 201 have exceeded the maximum available adhesion. Clearly, these values are given purely by way of example and different values may still be used. The MAAA signal 204 may be generated, for example, but not exclusively, by a WSP module when the latter detects a sliding, between the wheels relative to the axle controlled by the braking control module 201 and the rail, higher than a predefined value. The MAAA signal 204 may, moreover, be generated, for example but not exclusively, by an algorithm based on an "adhesion observer" as described in the Italian patent application no. 102016000034535, "Procedure for the control and possible recovery of the adhesion of the wheels of controlled axles of a railway vehicle" by FAIVELEY TRANSPORT ITALIA S.p.A.

The braking control module 201 is further arranged to generate, independently of any other braking control module 201, a brake torque request signal 205.

Such braking torque request signal 205 shall be generated as a function of the deceleration request signal 202 and a weight signal 203 indicative of the weight acting on an axle or on a bogie or on a carriage of the railway vehicle including the axle controlled by such braking control module 201.

The braking control module 201 is further arranged to provide said braking torque request signal 205 to a braking device 207 which is associated with an axle of the railway vehicle controlled by said braking control module 201.

The braking device 207 is arranged to convert the value of the braking torque request signal 205 into a braking torque having a determined braking torque value. For example, the higher the value of the braking torque request signal 205, the higher will be the determined braking torque value, or vice versa. Such braking torque being applied to an axle controlled by the braking control module 201 to cause at least one railway vehicle to decelerate. The braking torque is applied by achieving the aforesaid determined braking torque value according to a first predetermined torque gradient.

In other words, the application of braking torque by the braking device 207 takes place according to a predetermined first deceleration gradient previously set in said braking control module 201.

The first deceleration gradient, in a currently preferred embodiment of the invention, is the same for all the braking control modules 201 comprised in the braking system. Each braking control module 201 may provide for converting it locally into its own first braking torque gradient according to its own weight signal 203, in such a way that locally all braking control modules 201 comprised in the braking system contribute uniformly to the simultaneous achievement of the deceleration request.

The braking torque value generated may be calculated according to the deceleration request signal 202 and the weight signal 203 according to the known formula $F=m \cdot a$ and the appropriate Force→Torque conversion.

Said braking device 207 may be either a braking device arranged to provide a friction-type or electrodynamic-type braking force or a combination of braking devices arranged to provide friction-type braking force and braking devices to provide electrodynamic-type braking force which are managed according to blended strategies.

A WSP module 206 has the function of modulating the braking torque request signal 205 for the braking device 207, if the wheels 208 start to slide. Said WSP module 206 may be a system comprising at least one means for performing a modulation, according to determined algorithms, of the friction-type braking force or a software module for the modulation of the electrodynamic-type braking force. In a further possibility, the WSP module 206 may comprise both modulation system for the friction-type braking force and a software module for the modulation of the electrodynamic-type braking force. The above corresponding to the composition of the braking device 207. In the present description, the term "software module" means one or more software instructions comprised in a computer program that are adapted to be executed, for example by a microprocessor, to achieve a predetermined function or algorithm.

The value of the deceleration request signal 202 may also directly indicate a braking torque request value. In this case, the braking control module 201 may use the formula $a=F/m$ to determine the target deceleration value. Additionally, the value of the deceleration request signal 202 may directly indicate a pneumatic braking pressure request value, if the braking device 207 is a device of providing friction-type braking force.

In the presence of a deceleration request, the braking control module 201 generates a braking torque request signal 205 with a value corresponding to the value of said deceleration request signal 202.

Figure 3:
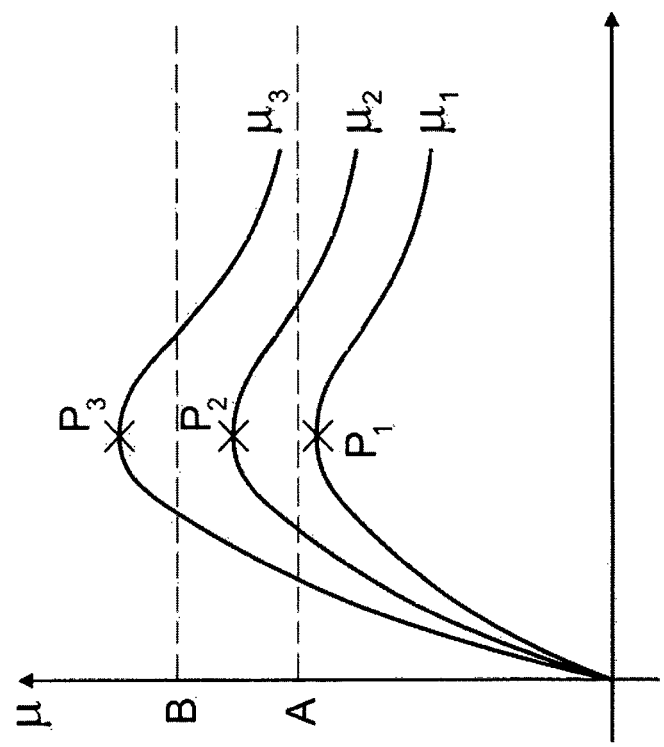
FIG. 3 illustrates the functional criteria of a single braking control module according to the present invention.

Referring now to FIG. 3, it is supposed that said deceleration request requires an available adhesion $\mu=A$. If the available adhesion is lower, for example represented by the curve $\mu 1$, the axle controlled by the braking control module 201 starts to slide as soon as the peak P1 is exceeded, the input MAAA 204 immediately assumes the value MAAA=1, the braking control module 201 however continues to increase the requested braking torque up to the value corresponding to line A, i.e. until the braking torque, previously calculated, corresponding to the value of the deceleration request signal 202 and to its own weight signal 203, is fully applied. It is the task of the WSP module 206 to limit the braking torque requested by the braking torque request signal 205 in order to maintain the sliding of the wheels 208 at a controlled speed value, eventually cleaning the rail partially or totally if necessary and increasing adhesion for the subsequent wheels.

The reason for this strategy is to force the rail cleaning action performed by the WSP module. Another reason is not to limit a braking torque request that may correspond to an emergency braking request. If the available adhesion is greater than line A, for example represented by the curve $\mu 2$, the input MAAA 204 maintains the value MAAA=0, thus indicating that the maximum available adhesion has not yet been achieved, or that there is still room to increase the braking torque. Said margin corresponds to the distance from line $\mu=A$ and point P2. The braking control module 201 then observes the deceleration value indicated by the instantaneous deceleration signal 209 or derives it from $a=F/m$, whether the deceleration request 202 occurs through a request for braking torque or braking pressure at the input.

If, when achieving the determined torque value from the applied braking torque, the current instantaneous deceleration value is lower than the target deceleration value, the braking control module 201 varies the value of the braking torque request signal 205 so as to increase the braking torque converted by the braking device 207. The braking control module 201 varies such value of the braking torque request signal 205 until the instantaneous deceleration value indicated by the instantaneous deceleration signal 209 received from the braking control module 201 achieves the deceleration target value of the at least one railway vehicle indicated by the deceleration request signal 202, or until the signal of achievement of the maximum available adhesion 204 has indicated that the maximum available adhesion has been achieved by an axle controlled by said braking control module 201 (directly proportional conversion). The braking torque applied is increased in accordance with a second predetermined torque gradient.

The second gradient is not necessarily the same as the first gradient. Similarly to the first deceleration gradient, in a currently preferred embodiment, the second deceleration gradient is the same for all the braking control modules 201 comprised in the braking system. Each braking control module 201 transforms it locally into its own second braking torque gradient depending on the weight signal 203. The additional increase ends when the requested or internally calculated deceleration value is achieved.

Figure 4:
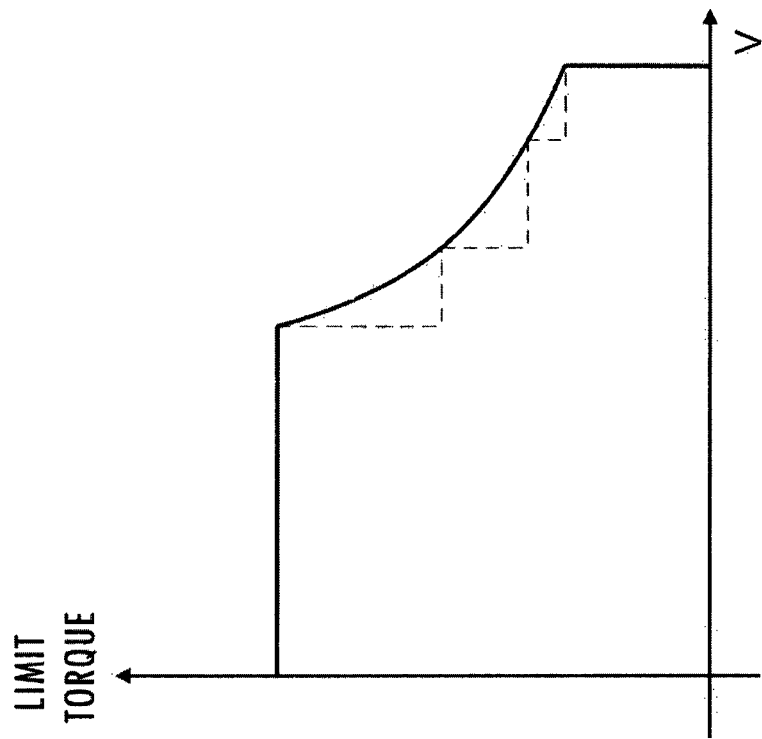
FIG. 4 shows the behavior curve of the braking torque limit as a function of the speed of the railway vehicle.

A braking torque limit value corresponding to the adhesion value µ=B may be stored inside the braking control module 201. Said braking torque limit value is necessary to avoid an excessive increase in braking torque, made possible by a possible available adhesion µ3. Excessive increases in braking torque may cause mechanical damage or high temperatures in the braking members. Those skilled in the art know that adhesion at the point of contact between the wheel and rail decreases as the speed of the vehicle increases. In order to avoid triggering sliding due to an excessive increase in braking torque beyond the nominal limits, said braking torque limit value may be a function of speed, as well as weight, as qualitatively illustrated in FIG. 4. Said function may have a continuous characteristic (continuous line) or with one or more steps (dotted line).

Figure 11:
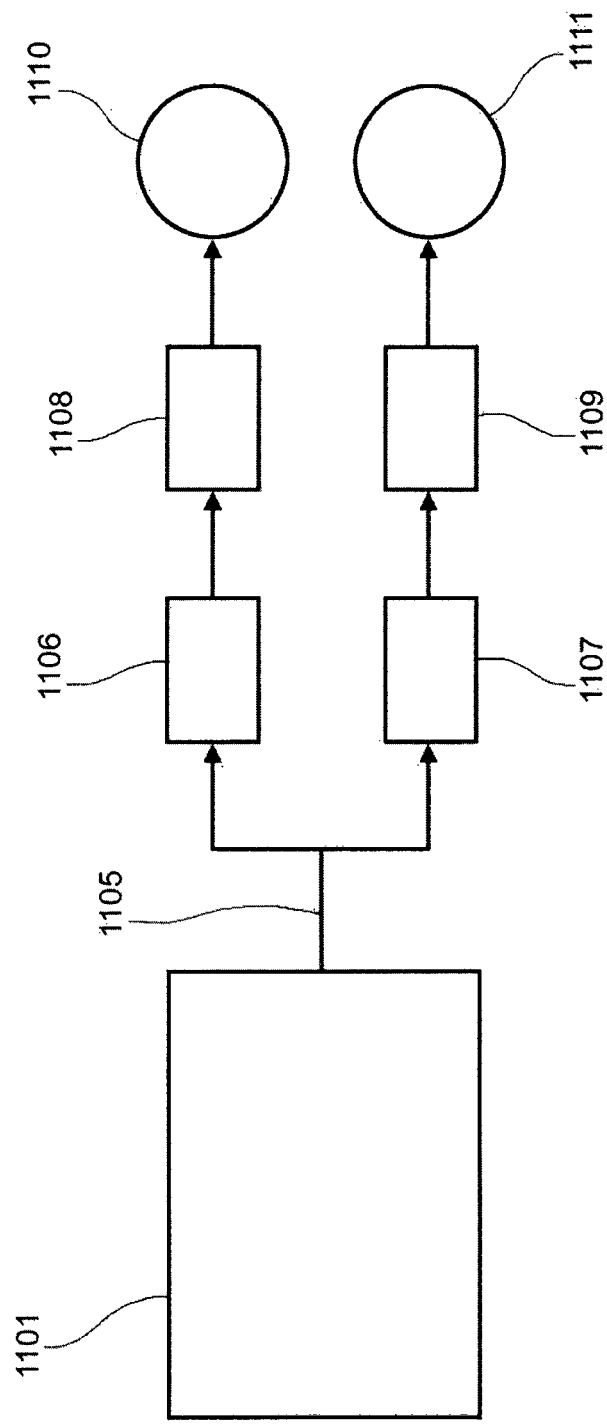
FIG. 11 illustrates the functional diagram of a system for the braking control of a two-axle bogie according to the present invention.

If the available adhesion corresponds for example to the curve µ2, if during the additional increase in braking torque the said adhesion curve µ2 is exceeded, a sliding phenomenon at the controlled axle 208 starts, the input 204 assumes the value MAAA=1, and the braking control module 201 reduces the braking torque value by a predetermined stored value. Said preset value may be zero or such as to reduce the braking torque value continuously until the condition MAAA=0 is achieved. The predetermined value, being in any case such as not to allow the applied braking torque value to be lower than the braking torque value initially requested by means of the deceleration request signal 202, corresponding to the straight line µ=A. That which has been described thus far refers to a "per-axle" torque control. FIG. 11 shows a control configuration "per bogie": the braking control module 1101 generates a braking torque request 1105 which is sent in parallel to braking torque generation modules 1108 and 1109 associated with the two axles represented by the wheels 1110 and 1111. To each axle is associated a WSP module 1106 and 1107, each WSP function used in controlling the sliding of the respective axes 1110 and 1111.

Also in this case, as described previously, the WSP module 1106 and 1107 may be a system or a software module, or it may be both a system and a software module.

In the configuration described in FIG. 11, the braking control module 1101 receives the same signals as those received from the braking control module 201 described previously.

Moreover, the braking control module 1101 continues to follow the procedure described previously and implemented by the braking control module 201 in FIG. 2. In the configuration described in FIG. 11, the MAAA signal assumes, for example, the value MAAA=0 when both axles corresponding to the wheels 1110 and 1111 are not in the sliding phase and assumes the value MAAA=1 when at least one of the axles corresponding to the wheels 1110 and 1111 is in the sliding phase.

As described above, a braking control module 201 or 1101 is completely autonomous in deciding which actions to take, without needing to communicate with one or more of the other modules comprised in the braking system.

Figure 5:
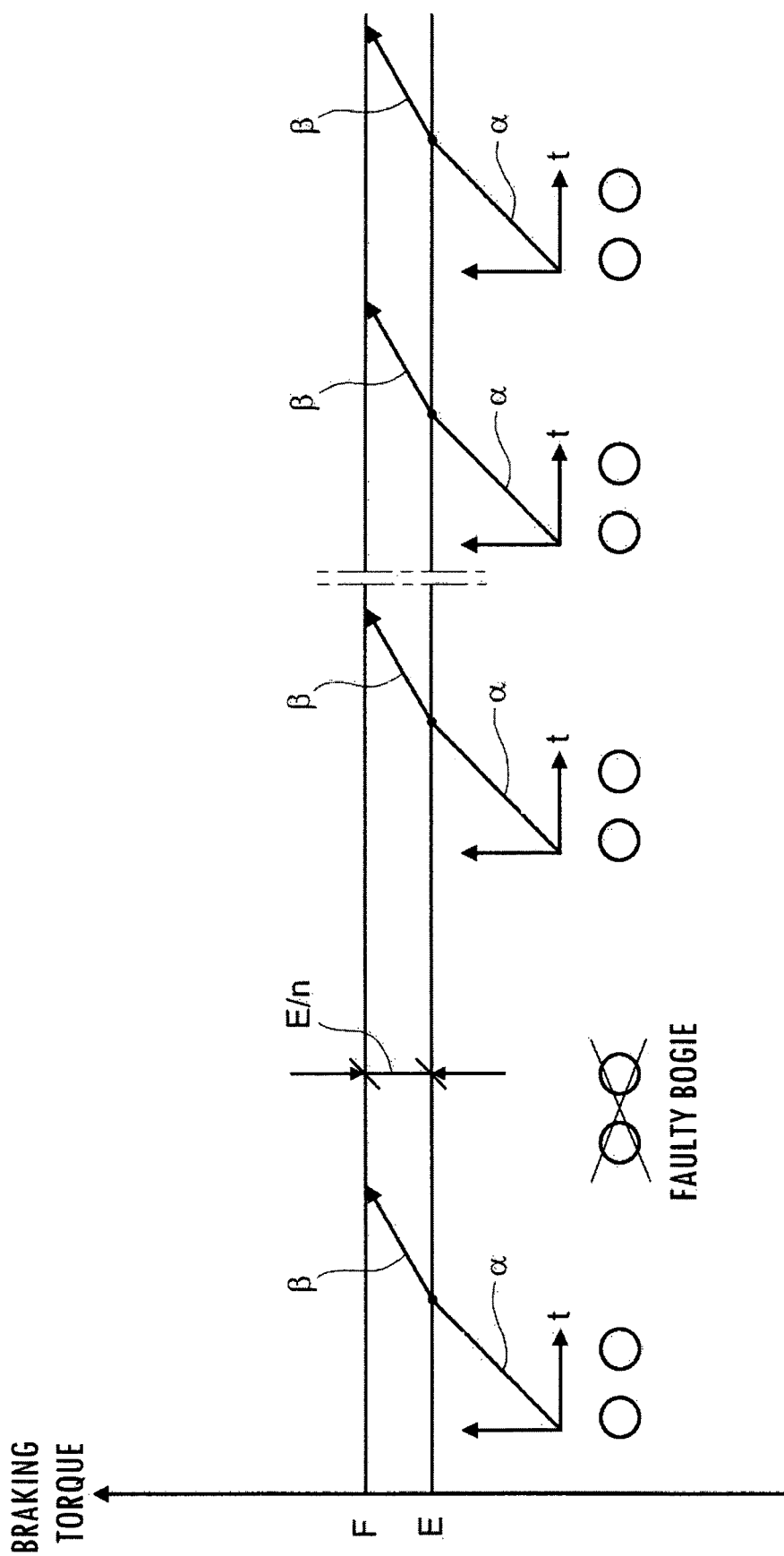
FIG. 5 illustrates, by way of example, the behavior of a braking control system for at least one railway vehicle made according to the present invention, in the event of failure of any of the braking control modules comprised in said service and emergency braking control system.

FIG. 5 illustrates the behavior of a railway braking control system composed of "n" functional modules receiving a deceleration request and each having the braking torque control per bogie as illustrated in FIG. 11, i.e. per pair of axles.

It is assumed, for simplicity of example, that on all the bogies the same weight value is used. As a result, for a given deceleration request, the braking torque will be the same for all braking modules, e.g. corresponding to line E.

Figure 6:
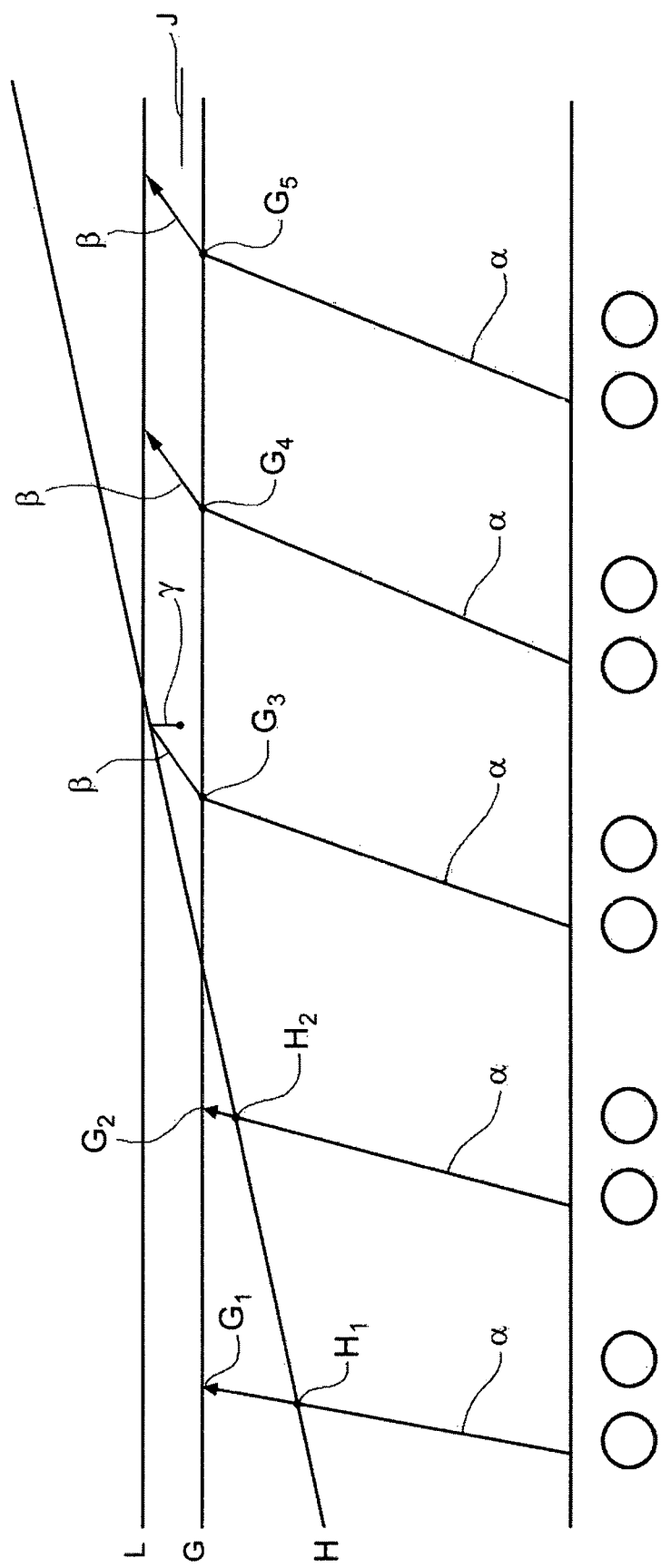
FIG. 6 illustrates, by way of example, the behavior of the braking control system for at least one railway vehicle made in accordance with the present invention in the event of degraded adhesion.
Figure 10:
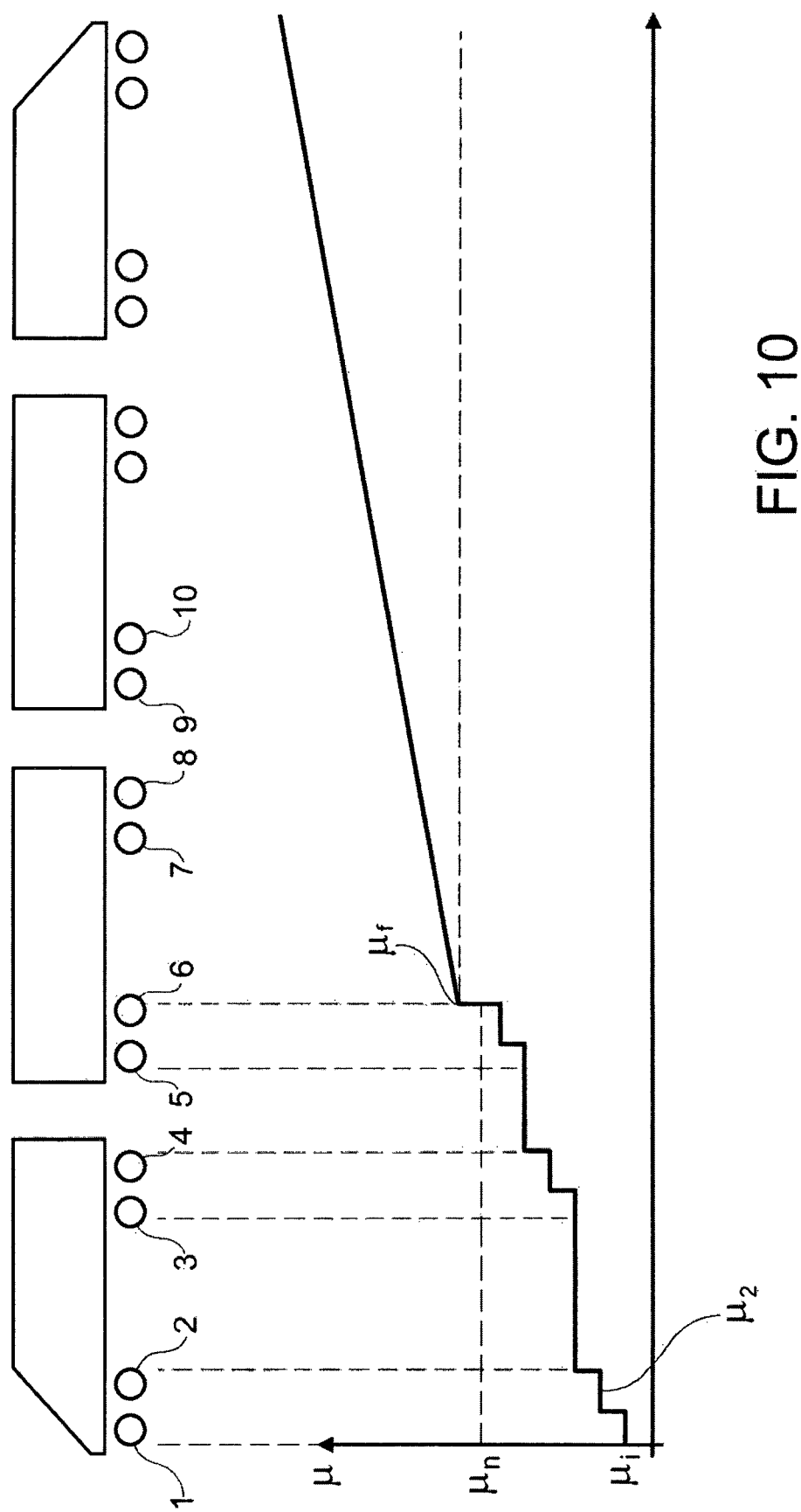
FIG. 10 shows the behavior of a railway train in case of degraded adhesion according to the state of the art.

In the same way, the braking torque increase gradient will also be the same for all the modules. By way of example, the second bogie is considered to be defective and unable to apply the calculated braking torque E. The active braking control modules 1101 will apply the braking torque to their bogie according to a common gradient α while simultaneously achieving the braking torque value E. At this point, said active braking control modules 1101 will observe that the deceleration value reached is lower than expected due to the lack of the braking contribution of the faulty bogie. In this condition, said braking control modules 1101 will begin to increase the braking torque with a second gradient equal to each other and not necessarily equal to the first gradient, represented by the angles β. The expected deceleration will be obtained when the braking torque produced by each active module has been increased by a value E/(n−1), i.e. by a value equal to that not supplied by the non-functioning module, distributed on the functioning modules. The braking torque value corresponding to line E, and subsequently the value corresponding to line F=E*n/(n−1), is achieved simultaneously by all the active braking control modules 1101, by virtue of the same gradients a and (I The same example is easily applicable in the case wherein, for reasons of temperature or rain, the friction coefficient between the brake discs and the brake pads is lower than the nominal design value. In this case, all the braking control modules 1101 will increase the braking torque to compensate for the lack of deceleration caused by the disc-pad friction deficiency. FIG. 6 illustrates the case of operation of the aforesaid system in the event of degraded adhesion. Line G represents the braking torque required to achieve the requested nominal deceleration; line H qualitatively represents the braking torque corresponding to the maximum available adhesion. The inclination of line H represents the cleaning phenomenon of the rail, approximating, by way of example, the steps of increase of µ illustrated in FIG. 10. It is known to those skilled in the art of railways that in reality what is represented by line H may occur in nature in the form of curves of which line H is a good approximation, and in any case sufficient for the present demonstration. At the deceleration request, all braking control modules 1101 will apply the braking torque G according to a first common gradient α. The axles corresponding to the first and second bogies will start to slide when the braking torque value applied to them reaches points H1 and H2 respectively on line H. The MAAA input signals to the modules relating to the first and second bogies will assume an MAAA=1 state due to the occurrence of sliding. The braking control modules 1101 relative to the first and second bogies will in any case provide for increasing the braking torque value reaching line G, the WSP modules 206 corresponding thereto will limit the braking torque to the bogies, keeping the axles in a controlled sliding condition. As described above, when the braking torque value G is achieved, the braking control modules 1101 relating to the first and second bogies, having received an MAAA=1 signal, will permanently maintain the braking torque value G. The remaining braking control modules 1101, when the pressure value "G" is reached, observe that the deceleration value achieved is lower than expected because the sliding of the first and second bogies prevents them from achieving the braking torque G. At the same time, they will be given an MAAA=0 signal. In this condition, they will start to increase the braking torque with a second gradient β equal to each other, for example, but not exclusively, slower than the first gradient. In the example, the braking torque at the third bogie intersects line H during the increase thereof, starting sliding at at least one of the axles of said third bogie. At this point, the corresponding braking control module 1101 receives MAAA=1 and thus, as described previously, reduces the braking torque with a fixed step y or continuously until it receives an MAAA=0 signal, interrupting the sliding on the axles of the corresponding third bogie, and still obtaining locally the highest possible braking torque. One may decide to assign the value zero to the parameter y. In this case, the braking torque is not reduced, and a permanent minimum sliding will be imposed, controlled by the relevant WSP module, which will accelerate the cleaning of the rail for the subsequent wheels.

In the example in FIG. 6, only the fourth and fifth bogies may achieve a braking torque value represented by line L so as to achieve the requested deceleration. If, on the other hand, a braking torque limit value J, with G<J<L corresponding to line B of FIG. 3, has been programmed, the braking control modules 1101 relative to said fourth and fifth bogies suspend the increase in braking torque and the expected deceleration is not achieved. However, the deceleration of the vehicle or the train of vehicles is always best maximized even in the degraded condition.

It is easy to understand how the proposed system may cover complex cases such as the simultaneous failures of the braking system and low adhesion conditions.

A variant that improves upon that which is described in FIG. 6, referring for example, but not exclusively, to the braking control module 201, 1101, is represented by the fact that said braking control module 201, 1101, in the presence of an MAAA=1 signal, may activate a possible adhesion recovering device 211 connected thereto by means of a respective control signal 210. The adhesion recovering device 211 may, for example, but not exclusively, comprise one or more sandboxes electrically connected to this braking control module. Or, said adhesion recovering device 211 may, for example, but not exclusively, comprise one or more devices for injection of material adapted to increase the friction coefficient between the wheel and the rail.

For example, said control signal 210 may be a binary signal so as to control the flow of sand or other adhesion recovering devices 211 in an on/off mode.

Moreover, again by way of example, the control signal 210 may be a continuous control signal arranged to control the flow of sand or other means for improving adhesion according to a continuous law proportional to the speed of the vehicle 214, or according to a continuous law proportional to the distance between point H associated with said braking control module 201 and line G of FIG. 6, or according to a continuous law proportional to the speed of the vehicle 214 and to the distance between point H associated with said braking control module 201 and line G of FIG. 6.

Each braking control module 201 may also deactivate said adhesion recovering device 211 upon reaching a predetermined sliding value that may be stored in a memory means or a predetermined minimum instantaneous adhesion value that may be stored in such memory means.

Likewise, said braking control module 201, 1101, in the presence of an MAAA=1 signal, may activate one or more magnetic brake shoes 213 connected thereto by means of an activation and deactivation signal 212 in order to perform a cleaning action of the rail, so as to increase the available adhesion. On the other hand, if there is an MAAA=0 signal, the braking control module 201, 1101 may interrupt the activation of said magnetic brake pads 213.

Said activation and deactivation signal 212 of the magnetic brake shoes may be sent with a temporal wave hysteresis to avoid possible continuous oscillations of the same control signal, which could damage the magnetic brake shoes 213.

The activation of the adhesion recovering device 211 or the magnetic brake shoes 213 described above is intended to move line "H" of FIG. 6 to the left. In this case, a greater number of bogies may contribute to recovering the requested deceleration by each using a lower amount of braking torque, possibly avoiding the intersection with the curve μ=B of FIG. 3.

The magnetic brake shoes 213 may be deactivated by the braking control module 201 upon achieving a predetermined minimum sliding value that may be stored in the memory means or upon achieving a predetermined minimum instantaneous adhesion value that may be stored in the memory means.

The braking torque or pneumatic pressure generated by at least one braking device 207 may be interrupted by the braking control module 201 when a predetermined braking torque or pneumatic pressure value is achieved, which may be stored in the memory means.

The following is an illustration of some example embodiments of a system for controlling service and emergency braking.

In a first embodiment illustrated in FIG. 7, the braking control system is an electropneumatic system.

Such system comprises a pneumatic relay valve 701, which may be controlled by two pilot chambers 702 and 703. On the input 705 of said relay valve 701, a pneumatic supply may be provided coming from reservoirs (not shown in FIG. 7). The supply may be provided at a higher pressure than that requested by the users connected to the output 704.

Said devices may be one or more braking cylinders relating to an axle, or to a bogie, or to a vehicle (said cylinders are not shown in FIG. 7).

The valves 112, controlled by the WSP modules 104, may be interposed between the output 704 of the relay valve 701 and the brake cylinders. The valve 701 may return to its output 704 the pressure value corresponding to the highest value among those present at the control inputs 702A and 703B.

The input 702A may be energized by a pressure coming from an emergency request (not shown in FIG. 7).

A calibrated orifice 711 may limit the pressure gradient coming from the value of the emergency braking request signal 202. The input 703B may be energized with a pressure 707, said service braking, coming from a modulating action performed by a pair of solenoid valves 708 and 709 controlled by the braking control module 201, which in this embodiment is a microprocessor system 712. The modulating action is known to those skilled in the art. In the case of service braking, the microprocessor system 712 may generate braking torque by acting on valves 708 and 709, causing the pressure 707 to increase, and consequently the pressure 704 for the pneumatic user.

In the same way, the microprocessor system 712 may generate a braking torque by sending a suitable braking torque request 713 to the traction control system 717, which will control the related motors, not shown. Moreover, the microprocessor system may generate a braking torque as the summation in variable percentages over time of the pneumatic and electrodynamic torques described previously.

During service braking, the microprocessor system 712 may implement the strategies illustrated in FIG. 5 and FIG. 6, generating the braking torque first up to a level E in FIG. 5, i.e., a level G in FIG. 6 with gradient α. Subsequently, if the conditions require it, braking torque up to level F of FIG. 5 may be generated, that is, level H of FIG. 6 with a gradient β.

In the case of emergency braking, the microprocessor system 712 may duplicate at the input 703B the instantaneous pressure at the input 702A.

Said pressure at the input 702A may have a gradient α determined by the orifice 711, until simultaneously reaching the level E of FIG. 5, that is, level G of FIG. 6.

Subsequently, only the microprocessor system 712 may provide for the further growth of braking torque with gradient β until line F of FIG. 5 is reached, that is, line H of FIG. 6.

FIG. 8 illustrates a second embodiment, wherein the service and emergency braking control system is an electropneumatic system.

Said electropneumatic system comprises an electronic weighing pressure control module 810 which receives weight information 813 according to which said weighing pressure control module 810 controls an electropneumatic module 811 by means of control signals 812, so that said electropneumatic module 811 generates a pneumatic pressure 814 equal to the emergency braking pressure corresponding to said weight 813.

In this embodiment, the braking control module 201 is an electronic module 815 that may control a filling solenoid valve 816 and an emptying solenoid valve 817 respectively via the control signals 818 and 819.

Said signals 818 and 819 may be interrupted by contacts 820 of a relay energized by an emergency loop 821. Said contacts 820 may be shown in the condition of absence of a signal from the emergency loop 821, that is, of an asserted emergency braking request. When the emergency request is not asserted, i.e. the electrical signal from the emergency loop 821 is present, contacts 820 are closed and the electronic module 815 may actively control the filling 816 and emptying 817, 816 valves, producing a pilot pressure 822 proportional to a braking request 823 for an input 803 of the relay valve 801.

Said pilot pressure 822 may assume as maximum value a pressure value 814 equivalent to an emergency braking pressure. The relay valve 801 may receive a supply pressure 804 at its input 803 and may generate a braking pressure 805 at its output 802 for the brake cylinders, not shown in FIG. 8.

Said braking pressure 805 may have a value equal to the value of the pilot pressure 822 but with a flow rate suitable for the volume of the brake cylinders. In the event of an asserted emergency braking request, the signal coming from the emergency loop 821 may be de-energized, contacts 820 may open, and the solenoid valves 816 and 817 may be de-energized assuming the condition shown in FIG. 8. Thereby, the emergency braking pressure 814 may be brought back to the input 822 of the relay valve 801 with a gradient established by the calibrated orifice 806. The relay valve 801 may supply a pressure 805, equivalent to the emergency braking pressure 814, at its output 802 to energize the brake cylinders, not shown.

The electronic module 815 may carry out the strategies illustrated in FIG. 5 and FIG. 6, generating the braking torque up to a level E of FIG. 5, that is, a level G of FIG. 6 with gradient α.

Subsequently, if a further increase is requested up to line F of FIG. 5, that is, up to line H of FIG. 6, the electronic module 815 may configure the solenoid valves 816 and 817 as illustrated in FIG. 8, that is, in such a way as to bring the emergency braking pressure 814 permanently to the input 822 of the relay valve 801.

The weighing pressure control module 810 may control the module 811 providing for the increase in pressure according to a gradient β. Said pressure is necessary to reach line F of FIG. 5, that is, line H of FIG. 6.

During an emergency braking, the signal from the emergency loop 821 may be de-energized, the contacts 820 open, solenoid valves 816 and 817 are de-energized, assuming the condition shown in FIG. 8, whereby the emergency brake pressure 814 may be brought back to the input 822 of the relay valve 801 with a gradient established by the calibrated orifice 806. The orifice is calibrated according to the gradient α.

Subsequently, the electronic weighing pressure control module 810 may control the module 811 increasing the pressure according to a gradient β, said pressure being necessary to reach line F of the figure, that is, line H of FIG. 6.

FIG. 9 illustrates a third embodiment, wherein the service and emergency braking control system is an electropneumatic system.

Such electropneumatic system comprises an electronic weighing pressure control module 910 which receives weight information 913 according to which said weighing pressure control module 910 may control an electropneumatic module 911 by means of control signals 912. The electropneumatic module 911 may be controlled in such a way that said electropneumatic module 911 generates a pneumatic pressure 914 equal to the emergency braking pressure, corresponding to said weight 913.

In this embodiment, the braking control module 201 is an electronic module 915 that may control a filling solenoid valve 916 and an emptying solenoid valve 917 respectively via the control signals 918 and 919, said control signals 918 and 919 being interrupted by the contacts 920 of a relay energized by an emergency loop 921.

Said contacts 920 are illustrated in the condition of absence of a signal from the emergency loop 921, that is, an asserted emergency braking request. When the emergency request is not asserted, i.e. the electrical signal from the emergency loop 921 is present, the contacts 920 are closed and the electronic module 915 may actively control the valves 916 and 917, producing a braking pressure 922, proportional to a braking request 923, said braking pressure 922 being sent to the brake cylinders, not shown in FIG. 9. In the event of an asserted emergency braking request, line 921 is de-energized, the contacts 920 open, the solenoid valves 916 and 917 are de-energized, assuming the condition illustrated in FIG. 9, whereby the emergency braking pressure 914 is returned to the brake cylinders with a gradient established by the calibrated orifice 906.

During service braking, the electronic module 915 may carry out the strategies illustrated in FIG. 5 and FIG. 6, generating the braking torque up to a level E of FIG. 5, that is, a level G of FIG. 6 with gradient α.

Subsequently, if a further increase is requested up to line F of FIG. 5, that is, up to line H of FIG. 6, the electronic module 915 will configure the solenoid valves 916 and 917 as illustrated in FIG. 9, that is, in such a way as to return the pressure 914 permanently to the brake cylinders.

The weighing pressure control module 910 may control the module 911 providing for the increase in pressure according to a gradient β. Said pressure is necessary to reach line F of FIG. 5, that is, line H of FIG. 6. During an emergency braking request, line 921 is de-energized, the contacts 920 open, the solenoid valves 916 and 917 are de-energized assuming the condition shown in FIG. 9, whereby the emergency braking pressure 914 is returned to the brake cylinders with a gradient established by the calibrated orifice 906. Said orifice may be calibrated according to the gradient α. Subsequently, the weighing pressure control module 910 may control the electropneumatic module 911 providing for the increase in pressure according to a gradient β. Said pressure is necessary to reach line F of FIG. 5, that is, line H of FIG. 6.

Various aspects and embodiments of a service and emergency braking control system according to the present invention have been described. It is understood that each embodiment may be combined with any other embodiment. The invention, moreover, is not limited to the described embodiments, but may be varied without departing from the scope of protection as described and claimed herein.

The invention claimed is:

1. A braking control system, comprising:
a plurality of braking control modules, each of the braking control modules configured to control an axle of a vehicle,
receive a deceleration request signal sent to all of the braking control modules, the deceleration request signal indicating a deceleration target value of the vehicle that has to be reached, receive an instantaneous deceleration signal indicating an instantaneous deceleration value of the vehicle, and receive an adhesion signal indicating achievement of an upper level of available friction by the axle of the vehicle that is controlled by the respective braking control module,
each of the braking control modules also configured to generate, independent from others of the braking control modules, a braking torque request signal according to the deceleration request signal and a weight signal indicative of a weight acting on the axle, a bogie of the vehicle, or a carriage of the vehicle, each of the braking control modules also configured to provide the braking torque request signal to a braking device of the vehicle that is associated with the axle controlled by the respective braking control module, the braking device configured to convert a requested value of the braking torque request signal to a braking torque having a determined braking torque value applied to the axle controlled by the respective braking control module to slow down the vehicle, wherein an applied braking torque reaches the determined braking torque value according to a first predetermined torque gradient,
each of the braking control modules also configured to vary the requested value of the braking torque request signal to increase the applied braking torque converted by the braking device responsive to the instantaneous deceleration value being lower than the deceleration target value and until the instantaneous deceleration value indicated by the instantaneous deceleration signal received by the braking control module reaches the target deceleration value or until the adhesion signal indicates achievement of the upper level of available friction by the axle controlled by the respective braking control module, wherein the applied braking torque is increased in accordance with a second predetermined torque gradient.

2. The braking control system of claim 1, wherein the braking device comprises a friction brake, an electrodynamic regenerative brake, or a variable percentage composition of the friction brake and the electrodynamic regenerative brake.

3. The braking control system of claim 1, wherein the deceleration target value of the deceleration request signal is indicative of a braking torque value or of a pneumatic brake pressure value associated with an expected deceleration value of the vehicle.

4. The braking control system of claim 1, wherein each of the braking control modules is configured to interrupt generation of braking torque or pneumatic pressure by the braking device responsive to reaching a predetermined braking torque value or a predetermined pneumatic pressure value.

5. The braking control system of claim 1, wherein each of the braking control modules is configured to adjust the braking torque request signal so as to reduce the braking torque or pneumatic pressure generated by the braking device responsive to the adhesion signal indicating achievement of the upper level of available friction by the axle controlled by the respective braking control module.

6. The braking control system of claim 1, wherein the second predetermined torque gradient of each of the braking control modules is independent from the second predetermined torque gradients of others of the braking control modules.

7. The braking control system of claim 6, wherein the first predetermined torque gradient is equal for all the braking control modules of the vehicle.

8. The braking control system of claim 7, wherein the first and second predetermined torque gradients are calibrated by each of the braking control modules according to the weight signal received by each of the braking control modules.

9. The braking control system of claim 1, wherein each of the braking control modules is configured to activate at least one adhesion recovering device and to deactivate the at least one adhesion recovering device responsive to reaching a predetermined sliding value or a predetermined lower instantaneous adhesion value.

10. The braking control system of claim 1, wherein the braking control modules are configured to activate at least one electromagnetic shoe and deactivate the at least one electromagnetic shoe responsive to reaching a predetermined lower sliding value or responsive to reaching a predetermined lower instantaneous friction value.

11. The braking control system of claim 1, wherein the braking control modules are microprocessor systems.

12. The braking control system of claim 1, wherein the braking control modules are an electro-pneumatic modules.

13. The braking control system of claim 1, wherein the braking control modules are electronic weighing pressure control modules.

14. The braking control system of claim 6, wherein the second predetermined torque gradient is equal for each of the braking control modules of the vehicle.

15. A method, comprising:
receiving a deceleration request signal, an instantaneous deceleration signal, and an adhesion signal at each of several braking control modules configured to separately control different axles of a vehicle, the deceleration request signal indicating a deceleration target value of the vehicle, the instantaneous deceleration signal indicating an instantaneous deceleration value of the vehicle, the adhesion signal indicating achievement of an upper level of available friction by the axle of the vehicle that is controlled by the braking control module;
generating a braking torque request signal at each of the braking control modules according to the deceleration request signal and a weight signal indicative of a weight acting on the axle controlled by the respective braking control module, a bogie of the vehicle, or a carriage of the vehicle;
providing the braking torque request signal to braking devices of the vehicle that are associated with the axles controlled by the braking control modules;
converting a requested value of the braking torque request signal to a braking torque having a determined braking torque value applied to the axle controlled by the respective braking control module to slow down the vehicle, wherein an applied braking torque reaches the determined braking torque value according to a first predetermined torque gradient; and
varying the requested value of the braking torque request signal to increase the applied braking torque converted by the braking device responsive to the instantaneous deceleration value being lower than the deceleration target value and until the instantaneous deceleration value indicated by the instantaneous deceleration signal received by the braking control module reaches the target deceleration value or until the adhesion signal indicates achievement of the upper level of available friction by the axle controlled by the respective braking control module, wherein the applied braking torque is increased in accordance with a second predetermined torque gradient.

16. The method of claim 15, wherein the deceleration target value of the deceleration request signal is indicative of a braking torque value or of a pneumatic brake pressure value associated with an expected deceleration value of the vehicle.

17. The method of claim 15, further comprising:
interrupting generation of braking torque or pneumatic pressure by the braking device responsive to reaching a predetermined braking torque value or a predetermined pneumatic pressure value.

18. A system, comprising:
braking control modules configured to separately control braking devices of a vehicle, the braking control modules configured to receive a deceleration request signal, an instantaneous deceleration signal, and an adhesion signal, the deceleration request signal indicating a deceleration target value, the instantaneous deceleration signal indicating an instantaneous deceleration value, and the adhesion signal indicating achievement of an upper level of available friction by the braking devices,
the braking control modules configured to separately generate braking torque request signals according to the deceleration request signal and a weight acting on the vehicle, wherein the braking control modules are configured to generate the braking torque request signals such that an applied braking torque reaches a determined braking torque value according to a first predetermined torque gradient,
each of the braking control modules also configured to increase the applied braking torque converted by the braking device according to a second predetermined torque gradient responsive to the instantaneous deceleration value being lower than the deceleration target value until the instantaneous deceleration value indicated by the instantaneous deceleration signal reaches the target deceleration value or the adhesion signal indicates achievement of the upper level of available friction.

19. The system of claim 18, wherein the second predetermined torque gradient of each of the braking control modules is different from the second predetermined torque gradient of others of the braking control modules.

20. The system of claim 18, wherein the first predetermined torque gradient is equal for all the braking control modules of the vehicle.

* * * * *